United States Patent
Yasuda et al.

(10) Patent No.: US 9,394,964 B2
(45) Date of Patent: Jul. 19, 2016

(54) FLUID-FILLED VIBRATION DAMPING DEVICE

(71) Applicant: TOKAI RUBBER INDUSTRIES, LTD., Komaki-shi, Aichi (JP)

(72) Inventors: Takayoshi Yasuda, Kitanagoya (JP); Hiroyuki Ichikawa, Kani (JP); Akio Saiki, Komaki (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 28 days.

(21) Appl. No.: 14/059,999

(22) Filed: Oct. 22, 2013

(65) Prior Publication Data

US 2014/0145383 A1   May 29, 2014

(30) Foreign Application Priority Data

Oct. 26, 2012   (JP) .................................. 2012-236908

(51) Int. Cl.
*F16F 13/26*   (2006.01)
*F16F 13/10*   (2006.01)

(52) U.S. Cl.
CPC ............. *F16F 13/268* (2013.01); *F16F 13/107* (2013.01)

(58) Field of Classification Search
CPC ....... F16D 13/268; F16D 13/10; F16D 13/16; F16D 13/08; F16D 13/105; F16D 13/106
USPC ............... 267/140.13, 140.14, 140.15, 140.4, 267/140.11
See application file for complete search history.

(56) References Cited

U.S. PATENT DOCUMENTS

| 5,180,148 | A | * | 1/1993 | Muramatsu | F16F 13/26 248/562 |
| 5,344,127 | A | * | 9/1994 | Hettler | F16F 13/26 367/140.13 |
| 5,639,073 | A | * | 6/1997 | Suzuki | F16F 13/26 367/140.13 |
| 6,244,578 | B1 | * | 6/2001 | Schwerdt | F16F 13/26 267/140.13 |
| 8,770,559 | B2 | | 7/2014 | Kadowaki et al. | |

(Continued)

FOREIGN PATENT DOCUMENTS

| JP | A-10-89402 | 4/1998 |
| JP | B2-3702909 | 10/2005 |

(Continued)

OTHER PUBLICATIONS

Apr. 20, 2016 Office Action issued in Japanese Application No. 2012-236908.

*Primary Examiner* — Robert A Siconolfi
*Assistant Examiner* — San Aung
(74) *Attorney, Agent, or Firm* — Oliff PLC (57) ABSTRACT

A fluid-filled vibration damping device including a second orifice passage and a third orifice passage tuned to a lower frequency than the second orifice passage, and an actuator including an output portion facing openings of the second and third orifice passages on a side of an equilibrium chamber via a flexible film. The flexible film obstructs the openings of the second and third orifice passages when the output portion comes into contact against a partition member so that the third orifice passage is blocked while the second orifice passage is substantially placed in communication owing to a center recess of the output portion permitting deformation of the flexible film. Meanwhile, the flexible film is separated from the openings of the second and third orifice passages when the output portion is separated from the partition member so that the two orifice passages are placed in communication.

9 Claims, 5 Drawing Sheets

(56) References Cited

U.S. PATENT DOCUMENTS

| | | | |
|---|---|---|---|
| 2003/0011116 A1* | 1/2003 | Kodama | F16F 13/26 267/140.13 |
| 2003/0011117 A1* | 1/2003 | Nishi | F16F 13/268 267/140.14 |
| 2003/0071401 A1* | 4/2003 | Kodama | F16F 13/101 267/140.13 |
| 2008/0315472 A1 | 12/2008 | Kadowaki et al. | |
| 2010/0219570 A1* | 9/2010 | Kojima | F16F 13/268 167/140.13 |

FOREIGN PATENT DOCUMENTS

| | | |
|---|---|---|
| JP | A-2008-121811 | 5/2008 |
| JP | 2009-002418 A | 1/2009 |
| JP | 2010-249288 A | 11/2010 |
| JP | 2010-255831 A | 11/2010 |

* cited by examiner

FLUID-FILLED VIBRATION DAMPING DEVICE

INCORPORATED BY REFERENCE

The disclosure of Japanese Patent Application No. 2012-236908 filed on Oct. 26, 2012 including the specification, drawings and abstract is incorporated herein by reference in its entirety.

BACKGROUND OF THE INVENTION

1. Field of the Invention

The present invention relates generally to a vibration damping device for use in an automotive engine mount or the like, for example, and more particularly, to a fluid-filled vibration damping device adapted to utilize vibration damping effect exhibited based on flow action of a non-compressible fluid filling the interior.

2. Description of the Related Art

Conventionally, vibration damping devices have been known as a one type of vibration damping connectors or vibration damping supports designed for installation between components making up a vibration transmission system and providing vibration damping linkage between the components. Such vibration damping devices have a structure in which a first mounting member and a second mounting member are elastically connected by a main rubber elastic body. Moreover, in order to obtain more enhanced vibration damping effect, there have been proposed fluid-filled vibration damping devices that utilize vibration damping effect based on flow action of a fluid, and are employed as an automotive engine mount or the like. The fluid-filled vibration damping device includes: a pressure-receiving chamber whose wall is partially constituted by the main rubber elastic body; an equilibrium chamber whose wall is partially constituted by a flexible film, the pressure-receiving chamber and the equilibrium chamber being filled with a non-compressible fluid; and an orifice passage permitting communication between the pressure-receiving chamber and the equilibrium chamber.

The fluid-filled vibration damping device exhibits excellent vibration damping effect based on flow action of a fluid or the like against vibration at specified frequencies to which the orifice passage is tuned. On the other hand, there is a problem that the device finds it difficult to exhibit effective vibration damping action against vibration in a frequency range which falls outside the tuning frequency of the orifice passage.

To address this issue, in Japanese Unexamined Patent Publication No. JP-A-10-089402 previously applied for, the applicant proposed a fluid-filled vibration damping device of pneumatic switching type which is able to exhibit effective vibration damping action through a single orifice passage against various types of vibrations having different frequencies by switching a communicating state of the orifice passage by means of a pneumatic actuator. Specifically, JP-A-10-089402 employs a structure in which the pneumatic actuator is disposed so as to face an opening of the orifice passage on the side of an equilibrium chamber with a flexible film being interposed therebetween, and the pneumatic actuator includes a center recess formed in a portion facing the opening of the orifice passage. With this arrangement, when atmospheric pressure is applied to the pneumatic actuator, the opening of the orifice passage on the side of an equilibrium chamber is covered by a movable film constituted by the flexible film, so as to set the tuning frequency of the orifice passage to a high frequency owing to the spring rigidity of the movable film. On the other hand, when a negative pressure is applied to the pneumatic actuator, the opening of the orifice passage on the side of an equilibrium chamber is opened, so that the tuning frequency of the orifice passage is set to a lower frequency in comparison with the case where the atmospheric pressure is applied.

However, additional research conducted by the inventors has led to the discovery that there is clearly room for further improvement regarding the fluid-filled vibration damping device disclosed in JP-A-10-089402. Specifically, with the structure of JP-A-10-089402, since the resonance frequency of the orifice passage is changed according to changes in the wall spring rigidity due to elasticity of the movable film, a high spring rigidity of the movable film is required in order to sufficiently change the resonance frequency of the orifice passage. However, if a high spring rigidity is set to the movable film, in a state where atmospheric pressure is applied to the pneumatic actuator, fluid flow through the orifice passage is prevented by the movable film. Thus, it may be difficult to efficiently achieve vibration damping effect on the basis of the flow action of the fluid.

SUMMARY OF THE INVENTION

It is therefore one object of this invention to provide a fluid-filled vibration damping device of novel structure which is able to efficiently obtain effective vibration damping action with respect to vibration at multiple frequencies or over a wide frequency range.

A first mode of the present invention provides a fluid-filled vibration damping device including: a first mounting member and a second mounting member elastically connected by a main rubber elastic body; a partition member supported by the second mounting member and defining to one side of the partition member a pressure-receiving chamber whose wall is partially constituted by the main rubber elastic body, while defining to another side of the partition member an equilibrium chamber whose wall is partially constituted by a flexible film, the pressure-receiving chamber and the equilibrium chamber being filled with a non-compressible fluid; and a first orifice passage formed in an outer peripheral portion of the partition member and permitting communication between the pressure-receiving chamber and the equilibrium chamber, the fluid-filled vibration damping device being characterized in that: in a center portion of the partition member, formed are a second orifice passage tuned to a higher frequency than the first orifice passage while permitting communication between the pressure-receiving chamber and the equilibrium chamber, and a third orifice passage tuned to a lower frequency than the second orifice passage while permitting communication between the pressure-receiving chamber and the equilibrium chamber; an actuator is disposed on an opposite side of the equilibrium chamber with the flexible film being interposed therebetween, and an output portion of the actuator faces openings of the second orifice passage and the third orifice passage on a side of the equilibrium chamber via the flexible film, while the output portion of the actuator includes a center recess that opens in a part facing the opening of the second orifice passage on the side of the equilibrium chamber; the flexible film is configured to obstruct the openings of the second orifice passage and the third orifice passage on the side of the equilibrium chamber by means of the output portion of the actuator coming into contact against the partition member via the flexible film so that the third orifice passage is blocked while the second orifice passage is held in a substantially communicating state owing to the center recess permitting deformation of a portion of the flexible film that obstructs the opening of the second orifice passage on the side of the equilibrium chamber; and the flexible film is configured to be separated from the openings of the second orifice passage and the third orifice passage on the side of the equilibrium chamber by means of the output portion of the actuator being separated from the partition member so that the second orifice passage and the third orifice passage are both placed in a communicating state.

With the fluid-filled vibration damping device according to the above first mode, in the state where the output portion of the actuator is in contact against the partition member via the flexible film, the openings of the second and third orifice passages are obstructed by the flexible film. Thus, fluid flow through the first orifice passage is efficiently produced, thereby effectively exhibiting vibration damping action based on flow action of the fluid with respect to low-frequency vibrations.

Moreover, even with the opening of the second orifice passage obstructed by the flexible film, the second orifice passage is held in a substantially communicating state where fluid flow is produced therethrough owing to deformation of the flexible film permitted by the center recess. This makes it possible to effectively attain vibration damping action based on flow action of the fluid with respect to high-frequency, small-amplitude vibration which falls outside the tuning frequency of the first orifice passage. Here, the description "the second orifice passage is held in a substantially communicating state even with its opening obstructed by the flexible film" refers to the state where fluid flow can be produced through the second orifice passage owing to deformation of the flexible film.

In the state where the output portion is in contact against the partition member as described above, the flexible film is restrained at the periphery of the opening of the second orifice passage. Thus, vibration damping effect by the fluid flow through the first orifice passage and vibration damping effect by the fluid flow through the second orifice passage are separately achieved at their respective tuning frequencies. Therefore, it is possible to obtain effective vibration damping action with respect to each of the low-frequency vibration and the high-frequency vibration.

On the other hand, when the output portion of the actuator is separated from the partition member so that the openings of the second and third orifice passage on the side of the equilibrium chamber are opened, the first through third orifice passages constitute a single fluid channel overall that connects the pressure-receiving chamber and the equilibrium chamber. In this respect, by forming the third orifice passage tuned to a lower frequency than the second orifice passage, the tuning frequency of the fluid channel constituted by those first through third orifice passages is set to a sufficiently lower frequency in comparison with the tuning frequency of the second orifice passage. Accordingly, the vibration damping action on the basis of the flow action of the fluid is effectively exhibited against vibrations in a different frequency range from those when the output portion of the actuator is in contact against the partition member, in more specific terms, vibrations in a frequency range between the tuning frequency of the first orifice passage and the tuning frequency of the second orifice passage.

In this way, the third orifice passage is able to adjust vibration damping characteristics in the state where the output portion of the actuator is separated from the partition member. This will avoid structural limitations such as the portion of the flexible film that covers the opening of the second orifice passage being made especially thicker, thereby making it possible to design according to the required durability, vibration damping ability or the like with a higher degree of freedom.

A second mode of the present invention provides the fluid-filled vibration damping device according to the first mode wherein a resonance frequency of a fluid flowing through the third orifice passage is set to a higher frequency than a resonance frequency of a fluid flowing through the first orifice passage.

According to the second mode, with the output portion of the actuator separated from the partition member, the tuning frequency of the third orifice passage sufficiently affects the tuning frequency of the fluid channel constituted by the first through third orifice passages, thereby being capable of adjusting the tuning frequency of the fluid channel to the frequency of the vibration to be damped.

A third mode of the present invention provides the fluid-filled vibration damping device according to the first or second mode wherein with the output portion of the actuator being in contact against the partition member via the flexible film, a resonance frequency of a fluid flowing through the first orifice passage is a low frequency that corresponds to an automotive engine shake while a resonance frequency of a fluid flowing through the second orifice passage is a high frequency that corresponds to an automotive driving rumble, and with the output portion of the actuator separated from the partition member, a resonance frequency of a fluid flowing between the pressure-receiving chamber and the equilibrium chamber is a midrange frequency that corresponds to an automotive idling vibration.

According to the third mode, especially when the device is used as the fluid-filled vibration damping device for automobiles, contact of the output portion of the actuator against the partition member will exhibit effective vibration damping action with respect to vibrations which can be a problem during driving of the automobile. Meanwhile, separation of the output portion of the actuator from the partition member will exhibit effective vibration damping action with respect to vibrations which can be a problem at a stop of the automobile.

A fourth mode of the present invention provides the fluid-filled vibration damping device according to any one of the first through third modes wherein the flexible film includes: a thin-walled deformation permission portion constituted by a portion that faces the opening of the second orifice passage on the side of the equilibrium chamber; and an obstruction retaining portion that is thicker than the deformation permission portion constituted by a portion that faces the opening of the third orifice passage on the side of the equilibrium chamber.

According to the fourth mode, with the output portion of the actuator being in contact against the partition member, the deformation permission portion that is more readily deformable obstructs the opening of the second orifice passage. Thus, fluid flow through the second orifice passage is efficiently produced so as to be able to advantageously exhibit vibration damping effect based on flow action of the fluid. Besides, the portion of the flexible film that obstructs the opening of the third orifice passage constitutes the obstruction retaining portion that is thick-walled and has an excellent shape stability. Accordingly, the third orifice passage will be stably blocked and the flexible film is able to ensure sufficient durability even if repeatedly pressed against the partition member.

A fifth mode of the present invention provides the fluid-filled vibration damping device according to any one of the first through fourth modes wherein the output portion of the actuator includes an air channel that penetrates a peripheral wall of the center recess, and the output portion is arranged such that a formation part of the air channel has a smaller diameter than a part facing the opening of the third orifice passage on the side of the equilibrium chamber.

According to the fifth mode, owing to the air channel, even if the opening of the center recess is covered by the flexible film, the deformation of the flexible film is permitted without being limited due to an air spring, thereby efficiently producing fluid flow through the second orifice passage. Moreover, the output portion of the actuator that constitutes the peripheral wall of the center recess is arranged such that the formation part of the air channel has a smaller diameter. Therefore, the opening of the air channel is held in a communicating state without being obstructed by the flexible film or the like, thereby stably permitting deformation of the portion of the flexible film that is positioned on the opening of the center recess. In addition, the portion of the output portion of the actuator that faces the opening of the third orifice passage has a larger diameter than the formation part of the air channel, so that the opening of the third orifice passage is configured to be obstructed by the output portion in a reliable manner.

Note that if the air channel is provided in plurality, one or some of these air channels may be provided in the portion of the output portion of the actuator that faces the opening of the third orifice passage. In such a case, by providing at least one of the plurality of air channels at a position away from the portion of the output portion that faces the opening of the third orifice passage and making the output portion smaller in diameter at the formation part of that air channel, the working effects of the present mode as described above can be obtained.

A sixth mode of the present invention provides the fluid-filled vibration damping device according to any one of the first through fifth modes wherein the actuator comprises a pneumatic actuator that includes a working air chamber whose air pressure is modifiable and in which the output portion is displaced depending on changes of the air pressure within the working air chamber.

The sixth mode makes it possible to displace the output portion through a simple structure, thereby realizing decrease in the number of parts, reduced weight, or the like. Furthermore, when the present mode is implemented in the fluid-filled vibration damping device for automobiles, by applying negative pressure generated at a stop of the automobile to the working air chamber, the actuator can be operated without providing any special power source, so as to achieve a more simple structure.

According to the present invention, with the output portion of the actuator being in contact against the partition member via the flexible film, fluid flow is produced through the first orifice passage and the second orifice passage, thereby effectively attaining vibration damping action based on flow action of the fluid. On the other hand, with the output portion of the actuator separated from the partition member, the first through third orifice passages function as a single fluid channel. At this point, owing to the third orifice passage which is tuned to a lower frequency than the second orifice passage and is provided in a communicating state, it is possible to obtain vibration damping effect based on flow action of the fluid within a lower frequency range than the tuning frequency of the second orifice passage.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

An embodiment of the present invention is described below with reference to the accompanying drawings.

Figure 1:
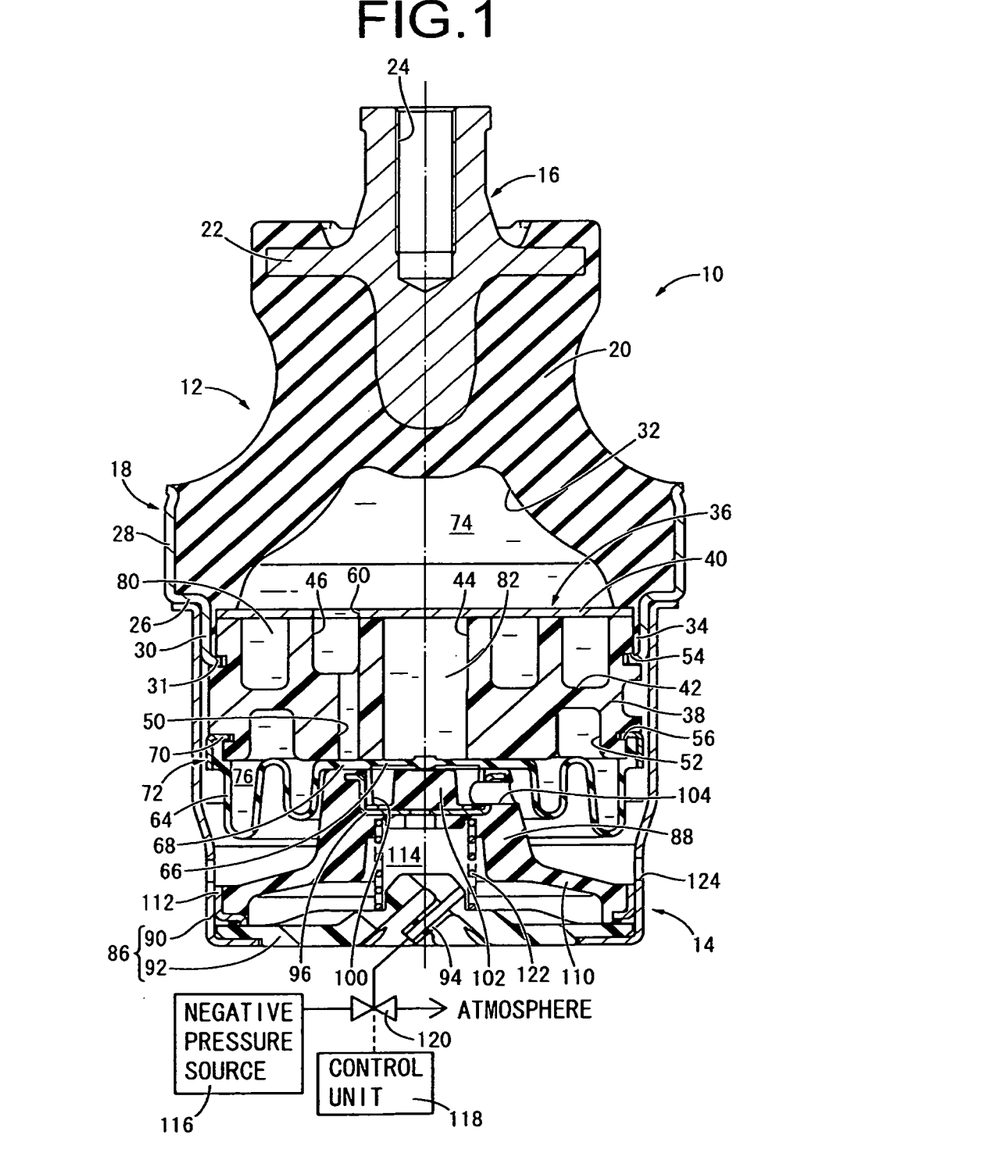
FIG. 1 is an elevational view in axial or vertical cross section of a fluid-filled vibration damping device in the form of an engine mount according to a first embodiment of the present invention, taken along line 1-1 of FIG. 2.

Referring first to FIG. 1, there is depicted an automotive engine mount 10 as a first embodiment of the fluid-filled vibration damping device constructed according to the present invention. The engine mount 10 has a construction in which a pneumatic actuator 14 is attached to a mount body 12, and the mount body 12 includes a first mounting member 16 and a second mounting member 18 elastically connected by a main rubber elastic body 20. In the description hereinbelow, as a general rule the vertical direction refers to the vertical direction in FIG. 1, which is the principal vibration input direction as well as the mount axial direction.

Described more specifically, the first mounting member 16 is a high rigidity component made of iron, aluminum alloy or the like having a round block shape that extends in the vertical direction, and integrally includes a flange portion 22 of annular disk shape projecting peripherally outward from the vertically medial section thereof. The first mounting member 16 further includes a screw hole 24 that vertically extends on the center axis and opens onto the upper face thereof, and is configured to be mounted onto a power unit (not shown) by means of a mounting bolt threaded onto the screw hole 24.

The second mounting member 18 is a high rigidity component similar to the first mounting member 16 having a thin-walled, large-diameter, generally round tubular shape. The second mounting member 18 further includes a stepped portion 26 in the axially medial section thereof, which provides a large-diameter anchoring tubular portion 28 to the upper side of the stepped portion 26 and a small-diameter mating tubular portion 30 to the lower side of the stepped portion 26. In addition, the mating tubular portion 30 includes at its lower end portion an internal flange-shaped engaging claw 31 that protrudes peripherally inward. The second mounting member 18 is configured to be mounted onto a vehicle body (not shown) via an outer bracket (not shown) fastened externally thereto, for example.

The first mounting member 16 is generally coaxially positioned above the second mounting member 18, and the first mounting member 16 and the second mounting member 18 are elastically connected by the main rubber elastic body 20.

The main rubber elastic body 20 has a thick-walled, generally frustoconical shape, with its small-diameter side end being bonded by vulcanization to the first mounting member 16 while its large-diameter side end being bonded by vulcanization to the anchoring tubular portion 28 and the stepped portion 26 of the second mounting member 18. Thus, the main rubber elastic body 20 takes the form of an integrally vulcanization molded component incorporating the first mounting member 16 and the second mounting member 18.

Additionally, the main rubber elastic body 20 includes a large-diameter recess 32 that opens onto the large-diameter end face thereof. The large-diameter recess 32 is a recess that has an inverted, generally bowl shape progressively expanding towards the opening side, and is formed in the diametrical center section of the main rubber elastic body 20. Furthermore, to the outer peripheral side of the large-diameter recess 32 of the main rubber elastic body 20, integrally formed is a seal rubber layer 34 having a thin-walled, large-diameter, generally round tubular shape, extending downward so as to cover the inner circumferential face of the mating tubular portion 30 of the second mounting member 18.

Figure 2:
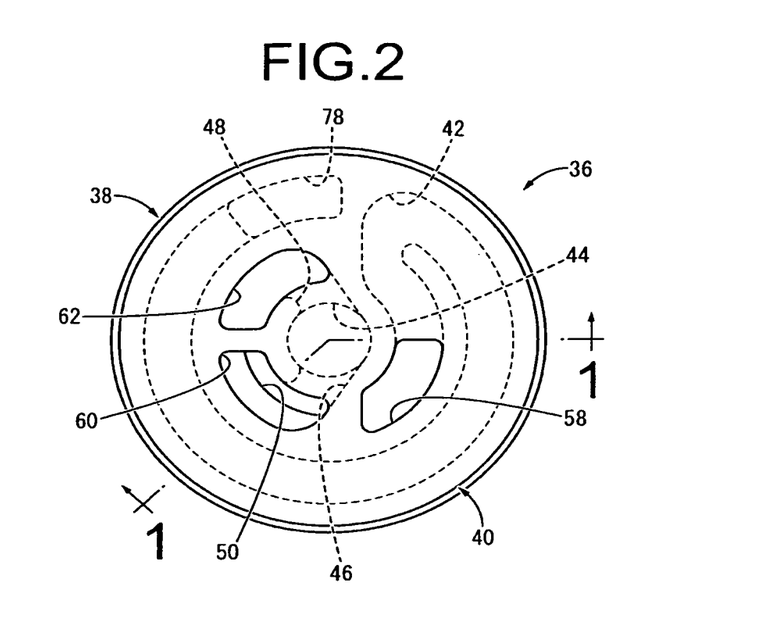
FIG. 2 is a top plane view of a partition member of the engine mount of FIG. 1.
Figure 3:
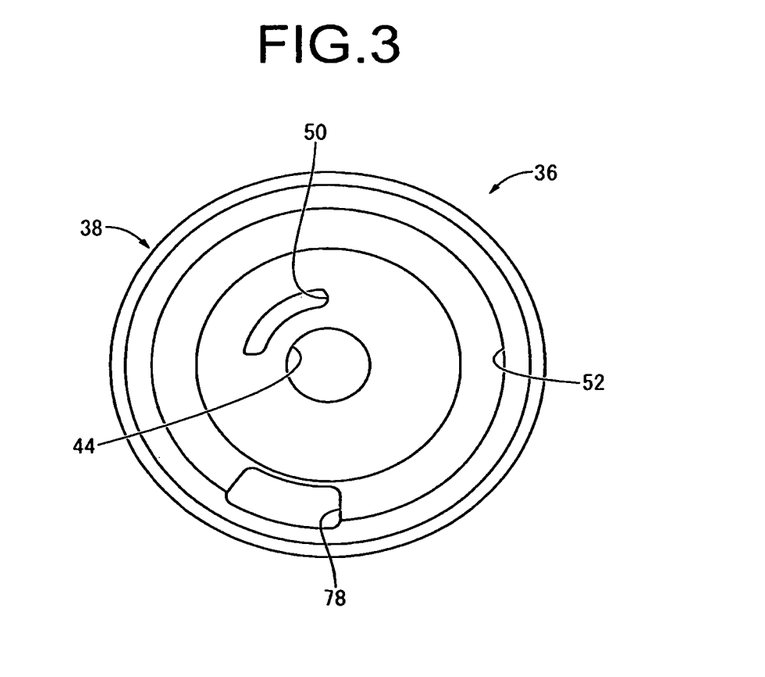
FIG. 3 is a bottom plane view of the partition member of FIG. 2.

A partition member 36 is attached to the integrally vulcanization molded component of the main rubber elastic body 20. As depicted in FIGS. 1 through 3, the partition member 36 is a rigid member made of synthetic resin, metal or the like, and has a thick-walled, generally circular disk shape. In the present embodiment, the partition member 36 comprises a partition member body 38 and a cover plate member 40.

Figure 4:
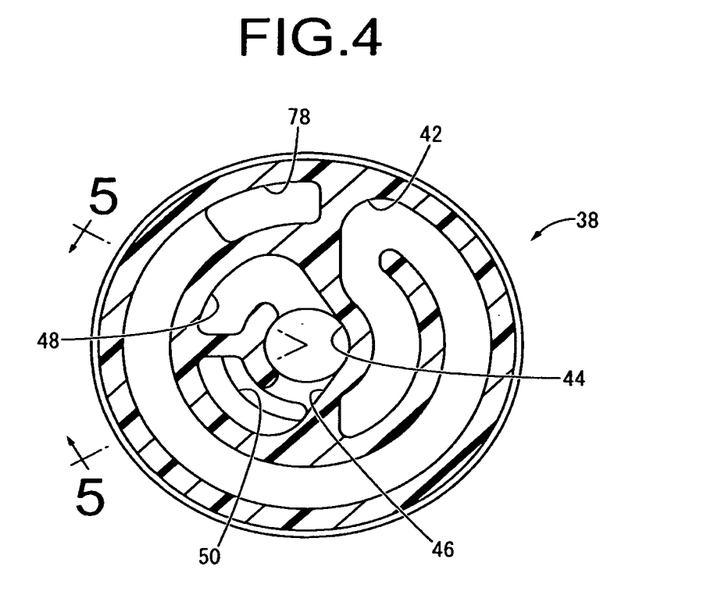
FIG. 4 is a transverse cross sectional view of a partition member body of the partition member of FIG. 2, taken along line 4-4 of FIG. 5.
Figure 5:
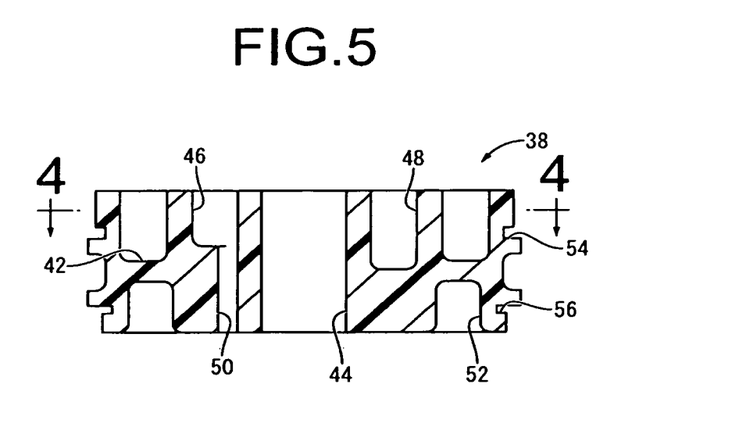
FIG. 5 is a cross sectional view taken along line 5-5 of FIG. 4.

As depicted in FIGS. 4 and 5, the partition member body 38 has a thick-walled, generally circular disk shape. The partition member body 38 includes in its outer peripheral portion a first recessed groove 42 that opens onto the upper face thereof and extends in the circumferential direction. One circumferential end of the first recessed groove 42 doubles back to the inner peripheral side so as to obtain a large length of the groove. Moreover, in the diametrical center portion of the partition member body 38, formed are a circular center hole 44 that vertically perforates therethrough, as well as a second recessed groove 46 and a third recessed groove 48 that open onto the upper face thereof. Both the recessed grooves 46, 48 have their one ends connected to the center hole 44. Meanwhile, the other ends of the recessed grooves 46, 48 are positioned along the same given circumference with a prescribed distance therebetween in the circumferential direction, and the second recessed groove 46 includes a communication hole 50 that vertically perforates the other end portion thereof. In the present embodiment, as depicted in FIG. 5, the second recessed groove 46 has a depth dimension smaller than that of the third recessed groove 48. In addition, in the outer peripheral portion of the partition member body 38, a lightening slot 52 is formed so as to open downward and extend in an annular form in the circumferential direction.

The partition member body 38 further includes an upper engaging slot 54 and a lower engaging slot 56 that open onto the outer circumferential face thereof at locations vertically separated by a given distance and extend annularly in the circumferential direction.

As depicted in FIGS. 1 and 2, the cover plate member 40 has a thin, generally circular disk shape, and is configured to cover each upper opening of the first through third recessed grooves 42, 46, 48 and the center hole 44 by being overlapped onto the upper face of the partition member body 38. Additionally, the cover plate member 40 is perforated in the thickness direction (vertical direction) by a first communication aperture 58 that opens at the doubled other end of the first recessed groove 42, a second communication aperture 60 that opens at the other end of the second recessed groove 46, and a third communication aperture 62 that opens at the other end of the third recessed groove 48.

The partition member 36, which is constructed by the cover plate member 40 being overlapped onto the upper face of the partition member body 38, is attached to the second mounting member 18, as depicted in FIG. 1, by means of the engaging claw 31 formed at the lower end of the second mounting member 18 being inserted and engaged into the upper engaging slot 54 of the partition member body 38. With the second mounting member 18 externally fitted onto the partition member 36, the second mounting member 18 is subjected to a diameter reduction process such as 360-degree radial compression, so that the engaging claw 31 is inserted into the upper engaging slot 54, and the mating tubular portion 30 of the second mounting member 18 is in close contact with the upper outer circumferential face of the partition member 36 via the seal rubber layer 34. By so doing, the partition member 36 is positioned with respect to the second mounting member 18 in the axial direction and in the axis-perpendicular direction, while providing a fluid-tight sealing between superposed surfaces between the second mounting member 18 and the partition member 36 owing to the seal rubber layer 34.

Moreover, a flexible film 64 is attached to the partition member 36 supported by the second mounting member 18. The flexible film 64 is a rubber film of thin-walled, large-diameter, generally circular disk shape, and its outer peripheral section has an ample slack so as to take on a vertically corrugated shape in the longitudinal cross section. In addition, the diametrical center section of the flexible film 64 has a generally circular disk shape, whose center portion constitutes a deformation permission portion 66 that is thin-walled and readily permitted deformation in the thickness direction, and whose outer peripheral portion constitutes an obstruction retaining portion 68 that is thicker than the deformation permission portion 66 and has excellent durability as well as shape stability. Note that the obstruction retaining portion 68 is made thicker than the slack outer peripheral section of the flexible film 64.

Furthermore, a fixing member 72 is bonded by vulcanization to the outer peripheral edge of the flexible film 64. The fixing member 72 has at its upper end portion an annular claw 70 projecting peripherally inward, and the flexible film 64 is attached to the partition member 36 by the claw 70 being inserted and engaged into the lower engaging slot 56 of the partition member body 38. The outer peripheral edge of the flexible film 64 is pressed between the fixing member 72 and the partition member body 38 in the radial direction, thereby providing a fluid-tight sealing between the fixing member 72 and the partition member body 38. The fixing member 72 is attached to the partition member body 38 in a similar way in which the second mounting member 18 is attached to the partition member body 38. Thus, by giving a diameter reduction to the second mounting member 18 and the fixing member 72 at the same time, for example, it is possible to simultaneously attach the integrally vulcanization molded component of the main rubber elastic body 20 and the flexible film 64 to the partition member 36.

Then, the partition member 36 covers the opening of the large-diameter recess 32 of the main rubber elastic body 20 so as to provide above the partition member 36 a pressure-receiving chamber 74 whose wall is partially constituted by the main rubber elastic body 20 and which gives rise to internal pressure fluctuations at times of vibration input. Meanwhile, the flexible film 64 covers the lower portion of the partition member 36 so as to provide below the partition member 36 an equilibrium chamber 76 whose wall is partially constituted by the flexible film 64 and which readily permits changes in volume.

The pressure-receiving chamber 74 and the equilibrium chamber 76 are each filled with a non-compressible fluid. While no particular limitation is imposed as to the non-compressible fluid filled in the pressure-receiving chamber 74 and the equilibrium chamber 76, preferred examples are water, alkylene glycols, polyalkylene glycols, silicone oil, and mixtures of these. In terms of effectively achieving vibration damping action based on flow action of the fluid, a low-viscosity fluid having viscosity of 0.1 Pa·s or lower is especially preferred. Sealing of the non-compressible fluid within the pressure-receiving chamber 74 and the equilibrium chamber 76 may be advantageously accomplished by, for example, carrying out assembly of the integrally vulcanization molded component of the main rubber elastic body 20 and the flexible film 64 to the partition member 36 while these components are immersed in a tank filled with the non-compressible fluid.

Besides, the opening of the first recessed groove 42 is covered by the cover plate member 40 so as to form a tunnel-like passage, one end of which communicates with the pressure-receiving chamber 74 via the first communication aperture 58, while the other end communicating with the equilibrium chamber 76 via a lower communication aperture 78 that has been formed passing through the partition member body 38. With this arrangement, a first orifice passage 80 that permits communication between the pressure-receiving chamber 74 and the equilibrium chamber 76 is formed in the outer peripheral portion of the partition member 36 utilizing the first recessed groove 42. Note that the first orifice passage 80, by adjusting the ratio (A/L) of the path cross sectional area (A) and the path length (L) in consideration of wall spring rigidity of the pressure-receiving chamber 74 and the equilibrium chamber 76, has the resonance frequency of the flowing fluid (tuning frequency) set to a low frequency of approximately 10 Hz which corresponds to engine shake.

In addition, one end of the center hole 44 communicates with the pressure-receiving chamber 74 via the second and third recessed grooves 46, 48 as well as the second and third communication apertures 60, 62. Meanwhile, the other opening of the center hole 44 communicates with the equilibrium chamber 76. With this arrangement, a second orifice passage 82 that permits communication between the pressure-receiving chamber 74 and the equilibrium chamber 76 is formed in the center portion of the partition member 36 utilizing the center hole 44 as well as the second and third recessed grooves 46, 48. Note that the second orifice passage 82 has the resonance frequency of the flowing fluid (tuning frequency) higher than that of the first orifice passage 80, and in the present embodiment, the frequency is set to a high frequency of approximately 100 Hz which corresponds to driving rumble.

Moreover, one end of the communication hole 50 communicates with the pressure-receiving chamber 74 via the second recessed groove 46 and the second communication aperture 60, while the other opening of the communication hole 50 communicates with the equilibrium chamber 76. With this arrangement, a third orifice passage 84 that permits communication between the pressure-receiving chamber 74 and the equilibrium chamber 76 is formed utilizing the communication hole 50, the second recessed groove 46, and the second communication aperture 60. Note that the third orifice passage 84 has the resonance frequency of the flowing fluid (tuning frequency) set to a midrange frequency that is higher than the tuning frequency of the first orifice passage 80 but lower than the tuning frequency of the second orifice passage 82. In the present embodiment, the tuning frequency of the third orifice passage 84 is set to a lower frequency than the frequency of idling vibration described later.

Figure 6:
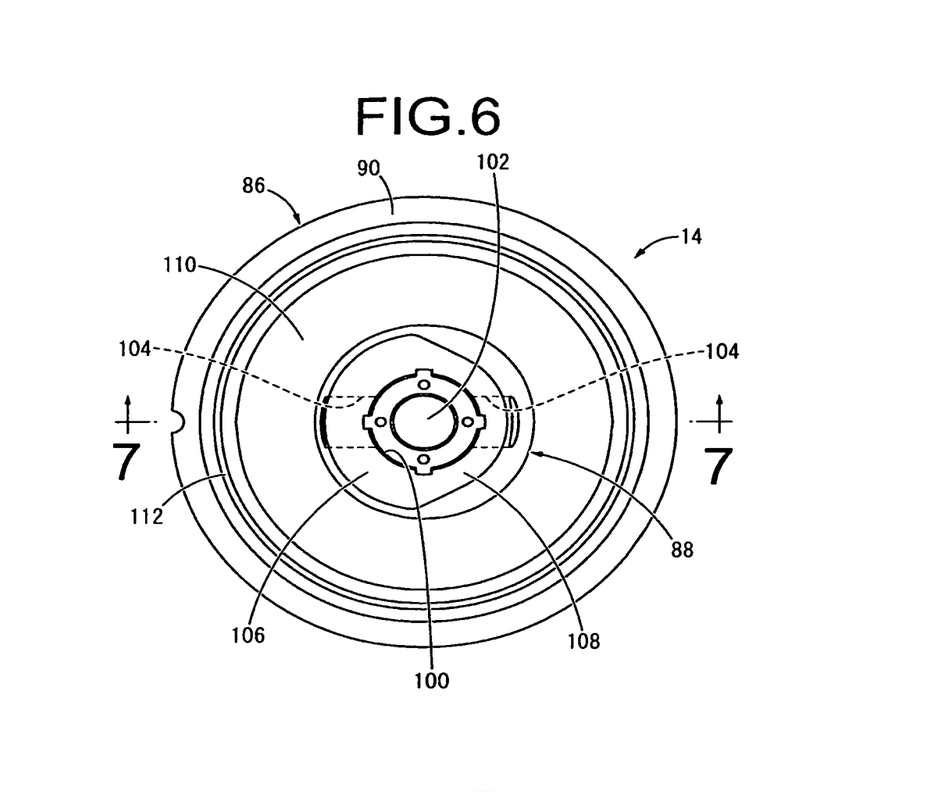
FIG. 6 is a top plane view of a pneumatic actuator of the engine mount of FIG. 1.
Figure 7:
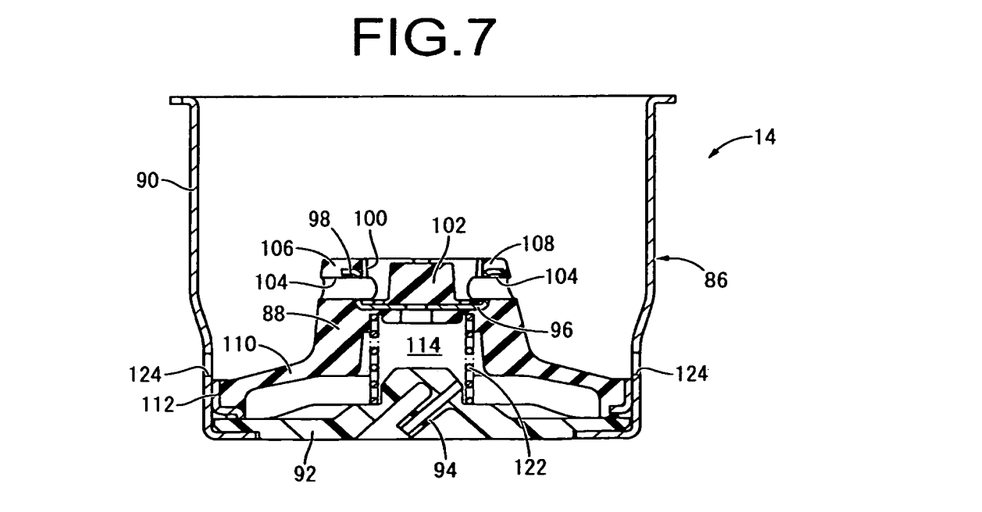
FIG. 7 is a cross sectional view taken along line 7-7 of FIG. 6.

An actuator 14 is disposed below the mount body 12 constructed in the above manner. The actuator 14 is a pneumatic actuator, and as depicted in FIGS. 6 and 7, has a construction in which an output portion 88 is attached to a housing 86.

The housing 86 has a round tubular shape with a bottom overall, and includes a connecting cylinder wall 90 of generally round tubular shape and a base wall plate 92 that obstructs the lower opening of the connecting cylinder wall 90. A port 94 is provided in the diametrical center section of the base wall plate 92.

The output portion 88 is formed of a rubber elastic body that has an inverted, generally round tubular shape with a bottom, and includes a reinforcing member 96 anchored in its upper base wall so as to be embedded therein. The reinforcing member 96 has a shallow, generally round tubular shape with a bottom, whose opening end (upper end) is outwardly bent so as to integrally form a contact flange 98.

In addition, in the diametrical center section of the output portion 88, a center recess 100 of generally circular shape opens upward utilizing the shape of the reinforcing member 96. In the present embodiment, the center recess 100 includes four grooves that open onto the outside peripheral inner face thereof, so that the center recess 100 is partially expanded at the four locations on the circumference where the grooves are formed. Moreover, a stopper protrusion 102 made of a rubber elastic body projects upward from the bottom in the diametrical center section of the center recess 100. Furthermore, a pair of air channels 104, 104 penetrate the peripheral wall of the center recess 100 and extend straightly along an axis lying in the axis-perpendicular direction (the sideways direction in FIG. 6), so as to penetrate the peripheral wall of the reinforcing member 96 in the radial direction. While the number of the air channels 104 is not limited in particular, by providing a plurality of air channels 104, it is less likely to occur that the center recess 100 becomes sealed off due to the outside peripheral opening of the air channel 104 being covered by the flexible film 64 or the like.

Besides, as depicted in FIG. 6, the output portion 88 according to the present embodiment has the outside diameter dimension varying along the circumference. Namely, the left half cycle in FIG. 6 constitutes a large-diameter thick-walled valve portion 106, while the right half cycle in FIG. 6 constitutes a small-diameter thin-walled constrained portion 108. Particularly with the output portion 88 in the present embodiment, the lower end portion has generally unchanging outside diameter and thickness about the entire circumference, while the upper end portion has the outside diameter dimension varying along the circumference due to the slope angle of the outside peripheral face with respect to the axial direction varying along the circumference. Note that one of the pair of air channels 104, 104 penetrates the thick-walled valve portion 106 and the other penetrates the thin-walled constrained portion 108.

The output portion 88 constructed in the above manner is arranged above the base wall plate 92 of the housing 86 in opposition with a prescribed separation distance therebetween, and is elastically connected with the housing 86 by a connecting rubber elastic body 110. The connecting rubber elastic body 110 is a rubber elastic body having a generally circular disk shape that is integrally formed with the lower end portion of the output portion 88 so as to project peripherally outward. In addition, a fastening ring 112 is anchored to the outer peripheral edge of the connecting rubber elastic body 110. The fastening ring 112 is inserted into the connecting cylinder wall 90 of the housing 86 and the connecting cylinder wall 90 is constricted in diameter, thereby fastening the outer peripheral edge of the connecting rubber elastic body 110 to the lower end portion of the housing 86. By so doing, the output portion 88 and the housing 86 are elastically connected with each other by the connecting rubber elastic body 110.

Through attachment of the output portion 88 to the housing 86, there is formed a working air chamber 114 sealed off from the outside between the output portion 88 and the base wall plate 92 of the housing 86. The working air chamber 114 is selectively connected to either the atmosphere or a negative pressure source 116 via the port 94 provided in the base wall plate 92, and by controlling a switching valve 120 by means of a control unit 118, either the atmospheric pressure or the negative pressure is applied, thereby making it possible to modify the air pressure.

Moreover, a coil spring 122 is interposed in a compressed state between axially opposed faces of the upper base wall of the output portion 88, to which the reinforcing member 96 is anchored, and the base wall plate 92. The output portion 88 is urged upward by elasticity of the coil spring 122.

The actuator 14 of the above construction is arranged below the mount body 12 as depicted in FIG. 1, and the housing 86 of the actuator 14 is fixed to and supported by the second mounting member 18 via the upper end portion of the connecting cylinder wall 90 being fitted externally onto the mating tubular portion 30 of the second mounting member 18.

Meanwhile, the output portion 88 of the actuator 14 is disposed on the opposite side (lower side) of the equilibrium chamber 76 with the flexible film 64 interposed therebetween, and is in contact against the center section of the flexible film 64 from below. With this arrangement, the output portion 88 faces each opening of the second and third orifice passages 82, 84 on the side of the equilibrium chamber 76, which is formed in the diametrical center section of the partition member 36, from below via the flexible film 64. Also, the opening of the center recess 100 provided in the output portion 88 faces the opening of the second orifice passage 82 on the side of the equilibrium chamber 76 from below, while the peripheral wall of the center recess 100 faces the opening of the third orifice passage 84 on the side of the equilibrium chamber 76 from below.

Then, with the atmospheric pressure applied to the working air chamber 114, the output portion 88 is urged upward by elasticity of the coil spring 122 and is in contact against the lower face of the partition member 36 via the flexible film 64. Thus, with the atmospheric pressure applied to the working air chamber 114, the openings of the second orifice passage 82 and the third orifice passage 84 on the side of the equilibrium chamber 76 are covered and obstructed by the flexible film 64.

In the present embodiment, the deformation permission portion 66 of the flexible film 64 is positioned on the opening of the second orifice passage 82, while a portion of the obstruction retaining portion 68 of the flexible film 64 is positioned on the opening of the third orifice passage 84. By the flexible film 64 being pressed against the lower face of the partition member 36, the opening of the center recess 100 and the opening of the second orifice passage 82 are both covered and obstructed by the deformation permission portion 66 of the flexible film 64, while the opening of the third orifice passage 84 is covered and obstructed by the obstruction retaining portion 68. In the present embodiment, the obstruction retaining portion 68 of the flexible film 64 is pressed against the lower face of the partition member 36 about the entire circumference owing to the output portion 88 being urged by elasticity of the coil spring 122.

In addition, the center recess 100 covered by the deformation permission portion 66 communicate with inside of the housing 86 via the air channel 104, while communicating with the outside via an air vent hole 124 that has been formed passing through the housing 86. Here, at the thin-walled constrained portion 108 having smaller diameter of the output portion 88, the obstruction retaining portion 68 protrudes peripherally outward beyond the upper end face of the output portion 88, and the slack outer peripheral section of the flexible film 64 is separated peripherally outward from the opening of the air channel 104. Thus, the air channel 104 is held in a stably communicating state.

In this way, with the atmospheric pressure applied to the working air chamber 114 of the actuator 14, the flexible film 64 covers and obstructs the openings of the second orifice passage 82 and the third orifice passage 84 on the side of the equilibrium chamber 76. By so doing, in the blocked state where the output portion 88 is in contact against the partition member 36, during input of low-frequency, large-amplitude vibration that corresponds to engine shake, fluid flow through the first orifice passage 80 is efficiently produced, thereby effectively exhibiting vibration damping action based on flow action of the fluid.

Also, the obstruction retaining portion 68 of the flexible film 64 is pressed against the opening of the third orifice passage 84 on the side of the equilibrium chamber 76 by the peripheral wall of the center recess 100. Thus, the third orifice passage 84 is blocked substantially as well, so that fluid flow cannot be produced through the third orifice passage 84. In the present embodiment in particular, the contact flange 98 is provided to the upper end portion of the reinforcing member 96, and with the output portion 88, the part facing the opening of the third orifice passage 84 constitutes the thick-walled, large-diameter thick-walled valve portion 106, so that the opening of the third orifice passage 84 is configured to be blocked in a more reliable manner. Additionally, the obstruction retaining portion 68 pressed against the opening of the third orifice passage 84 by the actuator 14 is made thicker than other portions of the flexible film 64, thereby obtaining sufficient durability against friction or compressive deformation.

On the other hand, with the output portion 88 being in contact against the partition member 36, the second orifice passage 82 covered by the deformation permission portion 66 is held in a substantially communicating state owing to the center recess 100 permitting deformation of the deformation permission portion 66 in the thickness direction. Here, the description "the second orifice passage 82 is held in a substantially communicating state" refers to the state where fluid flow is produced through the second orifice passage 82 and vibration damping effect based on flow action of the fluid is obtained. The second orifice passage 82 whose opening is covered by the deformation permission portion 66 is placed in a substantially communicating state where fluid flow can be produced therethrough owing to the deformation of the deformation permission portion 66 in the thickness direction. Therefore, vibration damping effect based on flow action of the fluid will be achieved against high-frequency, small-amplitude vibration that corresponds to driving rumble.

With the atmospheric pressure applied to the working air chamber 114 of the actuator 14, the obstruction retaining portion 68 is interposed and restrained between the output portion 88 and the partition member 36 about the entire circumference, so that the deformation permission portion 66 is substantially independent of the outer peripheral section of the flexible film 64. As a result, resonance of flowing fluid will be produced within the first orifice passage 80 and the second orifice passage 82 at their respective tuning frequencies. Therefore, the first orifice passage 80 and the second orifice passage 82 are able to exhibit respective vibration damping effects based on flow action of the fluid independently of each other against vibrations in mutually different frequency ranges.

The obstruction retaining portion 68 is not necessarily restrained continuously about the entire circumference but may be permitted deformation in the thickness direction partially along a circumference in the case where a groove for venting air is formed in the peripheral wall upper end portion of the center recess 100 of the output portion 88 or the like. However, in order to have the deformation permission portion 66 be substantially independent of the outer peripheral section of the flexible film 64, it is desirable that the obstruction retaining portion 68 be restrained over a wide area about the circumference.

In addition, the deformation permission portion 66 that covers the opening of the second orifice passage 82 on the side of the equilibrium chamber 76 is made much thinner in the thin-walled flexible film 64 and readily deformable, so that vibration damping effect based on flow action of the fluid is advantageously exhibited. Furthermore, in the present embodiment, the center recess 100 communicates with the outside through the air channel 104 and the air vent hole 124. Thus, the deformation of the deformation permission portion 66 is sufficiently permitted without being limited due to an air spring. In the present embodiment in particular, the output portion 88 is made smaller in diameter along approximately a half cycle which is away from the opening of the third orifice passage 84, and the outer peripheral opening of one air channel 104 is separated from the outer peripheral section of the flexible film 64 to the inner peripheral side. With this arrangement, the air channel 104 is stably held in the communicating state, and influence of the air spring on the center recess 100 is avoided.

Meanwhile, since the opening of the second orifice passage 82 is covered by the deformation permission portion 66, deformation of the deformation permission portion 66 cannot sufficiently follow against low-frequency, large-amplitude vibration that corresponds to engine shake, whereby the second orifice passage 82 becomes substantially blocked. Therefore, fluid flow through the first orifice passage 80 will efficiently take place, thereby effectively attaining desired vibration damping action. Moreover, a stopper means for limiting the level of deformation of the deformation permission portion 66 is constituted by contact against the stopper protrusion 102, so that damage to the deformation permission portion 66 due to its excessive deformation is avoided. Additionally, by adjusting the level of deformation of the deformation permission portion 66 by means of the stopper protrusion 102, it is possible to vary the film rigidity of the deformation permission portion 66 according to amplitude of the input vibration. Specifically, by making the film rigidity high through contact by the stopper protrusion 102 during input of large-amplitude vibration, better attenuating capability can be attained.

In this way, with the atmospheric pressure applied to the working air chamber 114, the first orifice passage 80 and the second orifice passage 82 exhibit the respective vibration damping effects, thereby effectively obtaining vibration damping actions against both engine shake and driving rumble that tend to be a problem during driving of the automobile.

Figure 8:
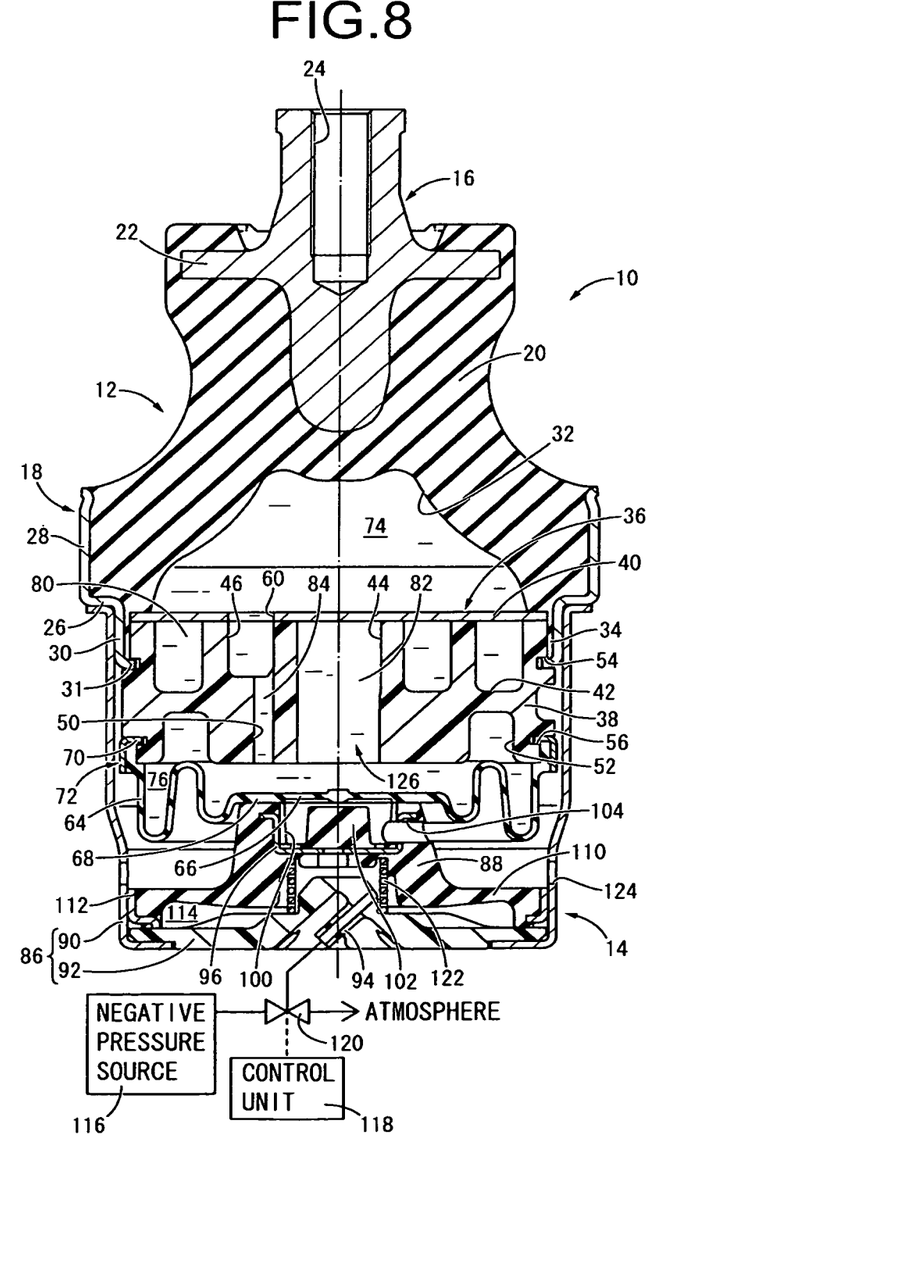
FIG. 8 is an elevational view in axial or vertical cross section of the engine mount of FIG. 1, showing a state where negative pressure is applied to a working air chamber.

On the other hand, when the negative pressure is applied to the working air chamber 114, as depicted in FIG. 8, the output portion 88 of the actuator 14 is suctioned downward so as to displace in opposition to the urging force of the coil spring 122. By so doing, the output portion 88 is downwardly separated from the partition member. 36 so that the flexible film 64 is separated from the openings of the second and third orifice passages 82, 84 on the side of the equilibrium chamber 76, thereby canceling obstruction of the second and third orifice passages 82, 84. Thus, the first through third orifice passages 80, 82, and 84 are all placed in a communicating state that connects the pressure-receiving chamber 74 and the equilibrium chamber 76, and the first through third orifice passages 80, 82, and 84 constitute a single fluid channel 126 overall. Specifically, when all of three orifice passages 80, 82, and 84 having different tuning frequencies are in the communicating state, these three orifice passages 80, 82, and 84 function as the single fluid channel 126 that is tuned to a midrange frequency of around ten or more Hz that corresponds to idling vibration overall. Therefore, vibration damping action based on flow action of the fluid is effectively exhibited against the idling vibration.

In order to obtain vibration damping effect based on flow action of the fluid within a frequency range that corresponds to idling vibration, it would be conceivable to set a high spring rigidity to the deformation permission portion 66 and shift the tuning frequency of the second orifice passage 82 towards the low frequency end depending on changes of the wall spring rigidity when the negative pressure is applied. However, in the present embodiment, by providing the third orifice passage 84 tuned to a lower frequency than the second orifice passage 82 and switching the third orifice passage 84 to the communicating state by means of the actuator 14, the overall tuning frequency is adjusted.

In this way, the engine mount 10 includes the third orifice passage 84 that is switchable between the communicating state and the blocked state by means of the actuator 14. Thus, the third orifice passage 84 functions, during its communicating state, as a tuning orifice that adjusts the resonance frequency of the fluid flowing through the fluid channel 126 to the frequency of the vibration to be damped. This makes it possible to readily and duly change the vibration damping characteristics between the state where the atmospheric pressure is applied and the state where the negative pressure is applied to the working air chamber 114. Therefore, the vibration damping characteristics required during driving of the automobile and the vibration damping characteristics required at a stop thereof are both efficiently attained.

Moreover, since the tuning frequency of the third orifice passage 84 is higher than the first orifice passage 80, with the negative pressure applied to the working air chamber 114, the third orifice passage 84 sufficiently affects the frequency tuning of the fluid channel 126. Therefore, it is possible to set the tuning frequencies of the first orifice passage 80 and the second orifice passage 82 according to the required vibration damping characteristics in the state where the atmospheric pressure is applied, while surely realizing the required vibration damping ability even in the state where the negative pressure is applied.

Also, in the present embodiment, the actuator 14 is a pneumatic actuator, and the negative pressure produced in the automobile at a stop can be utilized as the negative pressure source 116. Thus, at a stop in which the idling vibration can be a problem, the output portion 88 is configured to be sucked due to the negative pressure so as to form the fluid channel 126. This makes it possible to switch the vibration damping characteristics through a simple structure without needing any special output source for exerting actuating force on the output portion 88.

An embodiment of the present invention has been described in detail above, but the present invention is not limited to those specific descriptions. For example, the specific passage shapes of the first through third orifice passages are not limited but to be determined depending on the required vibration damping characteristics or the like.

Also, whereas in the preceding embodiment, the second orifice passage 82 and the third orifice passage 84 share a portion of their passages at their ends on the side of the pressure-receiving chamber 74, the second orifice passage and the third orifice passage may be provided as passages that are completely independent of each other.

Besides, with the flexible film, the deformation permission portion 66 and the obstruction retaining portion 68 are not essential, and it is acceptable to provide either one of them, or to form the entire flexible film with generally unchanging thickness. In addition, the portion of the flexible film that covers the opening of the second orifice passage 82 may be made thicker than the other portions. In such a case, it can be expected that the tuning frequency of the second orifice passage 82 changes depending on changes of the wall spring rigidity.

Moreover, the stopper protrusion is not essential, and if the center recess is shallow for example, a stopper means for limiting the level of deformation of the flexible film can be constituted by contact against the base wall inner surface of the center recess.

Additionally, the attachment structures of the partition member, the flexible film, and the actuator with respect to the second mounting member are not limited to those specifically taught in the preceding embodiment by way of example. For instance, the structure disclosed in Japanese Unexamined Patent Publication No. JP-A-2008-121811 or the like may also be employed.

Furthermore, the actuator is not limited to a pneumatic actuator but could instead be an electric actuator that uses driving force generated by an electric motor, or alternatively be an electromagnetic actuator that uses electromagnetic force or the like.

The application scope of the present invention is not limited to fluid-filled vibration damping devices used as engine mounts, but for example can also be preferably implemented in fluid-filled vibration damping devices used as body mounts, sub-frame mounts, differential mounts, and the like. Also, the present invention is applied not only to fluid-filled vibration damping devices for automobiles, but can also be used for fluid-filled vibration damping devices for motorcycles, rail vehicles, industrial vehicles and the like.

What is claimed is:

1. A fluid-filled vibration damping device comprising:
    a first mounting member and a second mounting member elastically connected by a main rubber elastic body;
    a partition member supported by the second mounting member and defining to one side of the partition member a pressure-receiving chamber whose wall is partially constituted by the main rubber elastic body, while defining to another side of the partition member an equilibrium chamber whose wall is partially constituted by a flexible film, the pressure-receiving chamber and the equilibrium chamber being filled with a non-compressible fluid; and
    a first orifice passage formed in an outer peripheral portion of the partition member and permitting communication between the pressure-receiving chamber and the equilibrium chamber;
    a second orifice passage formed in a center portion of the partition member and tuned to a higher frequency than the first orifice passage while permitting communication between the pressure-receiving chamber and the equilibrium chamber;
    a third orifice passage formed in the center portion of the partition member and tuned to a lower frequency than the second orifice passage while permitting communication between the pressure-receiving chamber and the equilibrium chamber; and
    an actuator disposed on an opposite side of the equilibrium chamber with the flexible film being interposed therebetween, wherein
    an output portion of the actuator faces openings of the second orifice passage and the third orifice passage on a side of the equilibrium chamber via the flexible film, while the output portion of the actuator includes a center recess that opens in a part facing the opening of the second orifice passage on the side of the equilibrium chamber,
    the output portion of the actuator and the flexible film are configured to obstruct the openings of the second orifice passage and the third orifice passage on the side of the equilibrium chamber by means of the output portion of the actuator coming into contact against the partition member via the flexible film so that
    a first portion of the flexible film that obstructs the opening of the third orifice passage on the side of the equilibrium chamber is not deformable and the third orifice passage is blocked from the equilibrium chamber, while a second portion of the flexible film that obstructs the opening of the second orifice passage on the side of the equilibrium chamber is permitted to deform owing to the center recess so that the second orifice passage is blocked from the equilibrium chamber and produces a fluid flowing through the second orifice passage owing to deformation of the second portion of the flexible film, and
    the output portion of the actuator and the flexible film are configured to be separated from the openings of the second orifice passage and the third orifice passage on the side of the equilibrium chamber by means of the output portion of the actuator being separated from the partition member so that the second orifice passage and the third orifice passage are both placed in a communicating state.

2. The fluid-filled vibration damping device according to claim 1, wherein a resonance frequency of a fluid flowing through the third orifice passage is set to a higher frequency than a resonance frequency of a fluid flowing through the first orifice passage.

3. The fluid-filled vibration damping device according to claim 1, wherein
    with the output portion of the actuator being in contact against the partition member via the flexible film, a resonance frequency of a fluid flowing through the first orifice passage is a low frequency that corresponds to an automotive engine shake while a resonance frequency of the fluid flowing through the second orifice passage owing to deformation of the second portion of the flexible film is a high frequency that corresponds to an automotive driving rumble, and
    with the output portion of the actuator separated from the partition member, a resonance frequency of a fluid flowing between the pressure-receiving chamber and the equilibrium chamber is a midrange frequency that corresponds to an automotive idling vibration.

4. The fluid-filled vibration damping device according to claim 1, wherein the flexible film includes: a thin-walled deformation permission portion constituted by the second portion of the flexible film that faces the opening of the second orifice passage on the side of the equilibrium chamber; and an obstruction retaining portion that is thicker than the deformation permission portion constituted by the first portion of the flexible film that faces the opening of the third orifice passage on the side of the equilibrium chamber.

5. The fluid-filled vibration damping device according to claim 1, wherein the output portion of the actuator includes an air channel that penetrates a peripheral wall of the center recess, and the output portion is arranged such that a formation part of the air channel has a smaller diameter than a part facing the opening of the third orifice passage on the side of the equilibrium chamber.

6. The fluid-filled vibration damping device according to claim 1, wherein the actuator comprises a pneumatic actuator that includes a working air chamber whose air pressure is modifiable and in which the output portion is displaced depending on changes of the air pressure within the working air chamber.

7. The fluid-filled vibration damping device according to claim 1, wherein the output portion of the actuator includes an air channel that penetrates a peripheral wall of the center recess, and the air channel extends in a direction orthogonal to a motion direction of the actuator so that an opening of the air channel is not opposite to the flexible film in the motion direction of the actuator.

8. The fluid-filled vibration damping device according to claim 1, wherein the output portion of the actuator includes a reinforcing member embedded therein, the reinforcing member having a tubular shape with a bottom, whose opening end is outwardly bent so as to integrally form a contact flange, and in a diametrically center section of the output portion, the central recess opens upward utilizing a shape of the reinforcing member embedded therein,
- wherein with the output portion of the actuator being in contact against the partition member via the flexible film, the first portion of the flexible film is pressed against the opening of the third orifice passage on the side of the equilibrium chamber by the contact flange of the reinforcing member, and
- wherein with the output portion of the actuator being in contact against the partition member via the flexible film, an opening of the center recess and the opening of the second orifice passage on the side of the equilibrium chamber are covered and obstructed by the second portion of the flexible film.

9. The fluid-filled vibration damping device according to claim 1, wherein a stopper protrusion projects upward from a bottom of the center recess so that a level of deformation of the second portion of the flexible film is limited by a contact of the second portion of the flexible film against the stopper protrusion.

* * * * *